United States Patent
Wiker et al.

[11] Patent Number: 5,704,745
[45] Date of Patent: Jan. 6, 1998

[54] CHUCK SLEEVE INSERT FOR A DRILL

[75] Inventors: Juergen Wiker; David H. Byrley; Zane Lockhart, Jr., all of Louisville; Debbie Ann Newhouse, Prospect; Gregory A. Phillips, LaGrange, all of Ky.

[73] Assignee: Credo Tool Company, Woodburn, Oreg.

[21] Appl. No.: 707,766

[22] Filed: Sep. 4, 1996

[51] Int. Cl.⁶ ........................................ B23B 51/02
[52] U.S. Cl. ............... 408/238; 408/239 R; 408/239 A; 279/143
[58] Field of Search .................... 279/143, 145; 408/239 A, 239 R, 238, 226, 191, 192, 223

[56] References Cited

U.S. PATENT DOCUMENTS

| | | |
|---|---|---|
| 5,036 | 3/1847 | Newton et al. . |
| 151,450 | 5/1874 | Tolman . |
| 180,554 | 8/1876 | Cubberley . |
| 308,707 | 12/1884 | Shirk . |
| 451,896 | 5/1891 | Merritt . |
| 1,022,135 | 2/1912 | Heinkel et al. . |
| 1,095,185 | 5/1914 | Broadbent et al. ................ 408/192 |
| 2,258,674 | 10/1941 | Ceska . |
| 2,966,081 | 12/1960 | Kallio . |
| 3,063,321 | 11/1962 | Mueller ................ 408/191 |
| 3,645,642 | 2/1972 | Koslow . |
| 3,863,316 | 2/1975 | Yeo . |
| 4,006,787 | 2/1977 | Rumpp et al. ................ 279/143 X |
| 4,035,100 | 7/1977 | Kruger et al. ................ 408/226 |
| 4,325,661 | 4/1982 | Tickins ................ 408/239 |
| 4,340,328 | 7/1982 | Proulx et al. ................ 408/239 |
| 4,536,107 | 8/1985 | Sandy et al. . |
| 4,605,347 | 8/1986 | Jodock et al. . |
| 4,932,815 | 6/1990 | Krauss . |
| 4,967,855 | 11/1990 | Moser . |
| 4,968,193 | 11/1990 | Chaconas et al. . |
| 5,030,043 | 7/1991 | Fischer et al. ................ 279/145 X |
| 5,143,490 | 9/1992 | Kopras . |
| 5,273,379 | 12/1993 | Nishimura . |
| 5,273,380 | 12/1993 | Musaechia . |
| 5,350,261 | 9/1994 | Takaya et al. . |
| 5,387,059 | 2/1995 | Borzemsky . |
| 5,478,176 | 12/1995 | Stedt et al. . |

FOREIGN PATENT DOCUMENTS

| | | | |
|---|---|---|---|
| 348850 | 5/1922 | Germany | 408/223 |
| 164267 | 11/1933 | Germany | 408/191 |

*Primary Examiner*—Daniel W. Howell
*Assistant Examiner*—Henry W. H. Tsai
*Attorney, Agent, or Firm*—Middleton & Reutlinger; Charles G. Lamb

[57] ABSTRACT

A double-ended drill bit having opposed cutting ends of different structural configurations is provided in combination with a sleeve or holder to be received within a drill chuck. The sleeve is provided with a cylindrical body having a top end with a pair of helically-shaped longitudinally extending members in spaced mating relation attached thereto. One cutting end of a drill bit is received within the cylindrical body and the spaced helically-shaped members.

15 Claims, 1 Drawing Sheet

CHUCK SLEEVE INSERT FOR A DRILL

BACKGROUND OF THE INVENTION

This invention relates to double ended drill bits and more particularly to a chuck sleeve for use with a double ended drill bit.

Double ended drill bits are well known in the art for use in prolonging the life of the bit by providing two cutting ends as opposed to a single cutting end. However, the placing of the cutting end which is not in use into a drill presents a problem for the drill chuck as it is difficult to hold the drill bit in a firm and steady condition. In one approach to providing special holders for the end not in use of a double-ended drill bit, U.S. Pat. No. 1,964,030 teaches a double ended drill bit with a special chuck or holder which has a split to receive the edges of the bit and when engaged in the chuck of a drill stock will close upon the sides of the drill bit. Other double-ended drill bits are provided with the cutting ends being shortened so the shank portion can be grasped by the chuck.

SUMMARY OF THE INVENTION

It is an object of the present invention to provide a double ended drill bit with dissimilar cutting or drilling ends.

It is another object of the present invention to provide a double ended drill bit having one end for metal drilling and the other end for wood drilling.

It is even another object of the present invention to provide a double ended drill bit having a split-point cutting end on one end and a brad point cutting end on an opposite end.

It is also an object of the present invention to provide a sleeve which will receive either end of a drill bit and jaws of a chuck of a drill will engage the sleeve.

It is even a further object of the present invention to provide a sleeve for a cutting end of a drill bit wherein the cutting end is a twist bit with two flutes.

More particularly, the present invention provides a sleeve for a double-ended drill bit comprising:

a cylindrical body portion having a bottom end and a top end; and, means to receive a cutting end of a drill bit, said cutting end being a twist bit with two flutes, said means being attached to said top end of said body for receipt by a chuck of a drill.

Further objects and advantages of this invention will appear to those skilled in the art from the following description and appended claims, reference being had to the accompanying drawings forming a part of the specification wherein like reference characters designate corresponding parts into several views.

DETAILED DESCRIPTION OF THE PREFERRED EMBODIMENT

Figure 1:
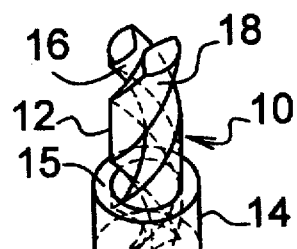
FIG. 1 is a perspective view of one preferred drill bit holding sleeve of the present invention.
Figure 2:
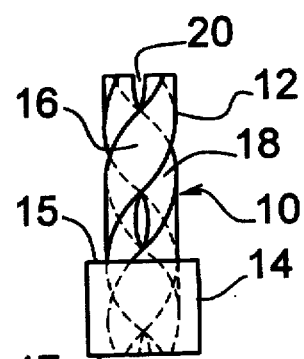
FIG. 2 is a side view of the sleeve of FIG. 1.
Figure 2A:
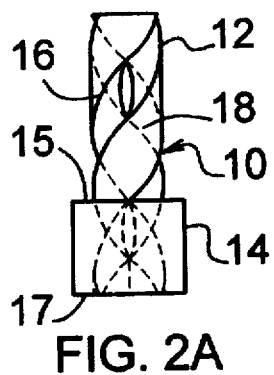
FIG. 2A is a side view of FIG. 1 rotated 90° from the side view shown in FIG. 2.
Figure 3:
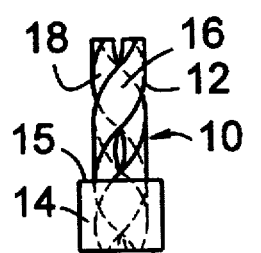
FIG. 3 is a top view of the sleeve of FIG. 2.
Figure 3:
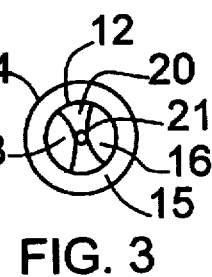

Referring to the Figures, a sleeve or holder 10 is provided to receive each of the cutting ends of a double-ended drill bit, particularly a double-ended drill bit 50 with each end being a twist drill bit having two flutes, such as, a drill bit having a brad point cutting end 52 on one end and a split-point cutting end 54 on the opposite end. The sleeve 10 is provided with a drill bit receiving end 12 which receives either cutting end 52, 54 of a drill bit 50 and a cylindrical body portion 14 having a centrally disposed opening 20 therethrough. Opening 20 is provided to receive a cutting end of drill bit 50 therethrough. Cylindrical body portion 14 is provided with a top end 15 and a bottom end 17. The drill bit receiving end 12 is provided with a pair of helically-shaped flexible legs 16 and 18 which extend longitudinally from the top end 15 of the cylindrical body portion 14 in a mating twisting relationship with a spacing 21 therebetween to receive the lands 58 and 58a of the drill bit end 52 (a brad point cutting end) and drill bit cutting end 54 (a split-point cutting end), respectively. The legs 16 and 18 are received within the flutes 59, 59a of the cutting ends 52, 54, respectively. Sleeve 10 is generally of a relatively hard plastic construction with the helically-shaped legs 16, 18 being unitary with the cylindrical body portion 14.

Figure 5:
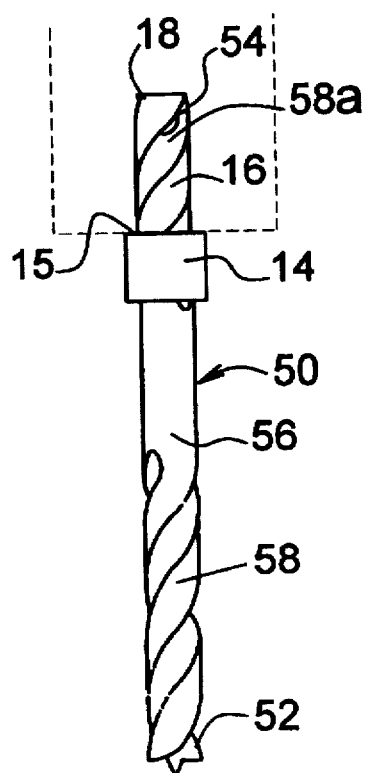

In cross-section, the diameter of the cylindrical body portion 14 is greater than the diameter of the cross-sectional surface of the legs 16 and 18 in their twist arrangement. Moreover, the diameter of the cross-sectional surface of the legs 16 and 18 in their twist arrangement is greater than the diameter of the cutting end of the drill bit received therein. In FIG. 5 it is shown that the outermost surface of legs 16 and 18 extend outwardly beyond the outermost surface of the flutes 58a so the jaws of a chuck engage the outer surface of legs 16 and 18. By providing legs 16 and 18 of sleeve 10 with a greater diameter than the diameter of the drill bit, this enables the jaws of the chuck a larger clamping surface area. Furthermore, as shown in FIG. 5, the top end 15 of body 14 is in abutting relation with the chuck of a drill as shown in phantom lines when in a use condition.

Figure 4:
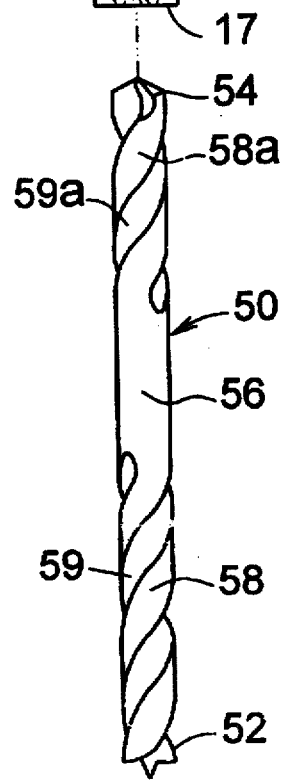
FIG. 4 is an exploded view of a double-ended drill bit of the present invention showing a cutting end of a drill bit adjacent a drill bit receiving end of the sleeve of FIG. 2; and, FIG. 5 is a side view of the exploded view of FIG. 4 with the sleeve receiving the cutting end of the drill bit.

When the drill bit of the present invention is used for metal drilling, the split-point cutting end 54 is used for the metal drilling and the brad point 52, as shown in FIGS. 4 and 5, is inserted and twisted or threaded inwardly between the helically-shaped longitudinally legs 16 and 18 of sleeve 10.

When the drill bit is used for the drilling of wood, for example, the brad point cutting end 52 is the cutting end used. Thus, the split-point cutting end 54 (not shown) is threaded into and between the helical extension 16, 18 in the same manner as the brad point cutting end 54.

With either end 52, 54 in place, sleeve 10 is then ready to be inserted into a drill chuck (as shown in phantom lines in FIG. 5) wherein the jaws of the drill chuck will engage the outer surfaces of the legs 16 and 18. The outer surfaces of the legs 16 and 18 are of a constant radius whereas the lands of a drill bit are generally provided with margins at their outer extremity which are of a non-constant radius thereby providing for a varying radii of its outer surface which in turn provides for a relatively small surface area upon which the three jaws of a drill chuck can grasp. Thus, by gripping the larger outer surface of legs 16 and 18 and the abutment of the body 14 against the end of the chuck, the drill bit is held straight in the chuck providing precision of movement while in use.

It is realized that even though a double-ended drill bit having a split-point end and a brad point end are shown in the described embodiment, other twist-type double-ended drill bits having different constructed cutting ends may also be used without departing from the principals and scope of the invention, as expressed in the claims appended hereto.

What is claimed is:

1. A sleeve for a drill bit comprising:
   a cylindrical body having a top end, an opposed end, and a centrally disposed opening; and,
   means to receive a cutting end of a twist drill bit having two flutes, said means being attached to said top end of said cylindrical body, said means to receive said cutting end of a twist drill bit being a pair of flexible helically-shaped longitudinally extending members in spaced mating relation.

2. The sleeve of claim 1, said sleeve being of unitary construction.

3. The sleeve of claim 2, said sleeve being constructed of a hard plastic material.

4. The sleeve of claim 1, said helically-shaped longitudinally extending members having a cross-sectional surface diameter equal to or greater than the cross-sectional surface diameter of said cutting ends.

5. The sleeve of claim 1, said twist drill bit having two opposed cutting ends.

6. The sleeve of claim 1, said cylindrical body having an outer diameter greater than the outer diameter of said means to receive a cutting end of a twist drill bit.

7. The sleeve of claim 1, said cylindrical body having an outer diameter greater than the outer diameter of said means to receive a cutting end of a twist drill bit, said helically-shaped longitudinally extending members having a cross-sectional surface diameter greater than a cross-sectional surface diameter of said cutting ends.

8. In combination with a double-ended drill bit, a sleeve for said drill bit comprising:
   a cylindrical body having a top end, an opposed end, and a centrally disposed opening therethrough; and,
   means to receive a cutting end of a twist drill bit having two flutes, said means being attached to said top end of said cylindrical body, said means to receive said cutting end of a twist drill bit being a pair of flexible helically-shaped longitudinally extending members in spaced mating relation.

9. The combination of claim 8, said sleeve being of unitary construction.

10. The combination of claim 9, said sleeve being constructed of a hard plastic material.

11. The combination of claim 8, said helically-shaped longitudinally extending member having a cross-sectional surface diameter equal to or greater than the cross-sectional surface diameter of said cutting ends.

12. The combination of claim 8, said twist drill bit having two opposed cutting ends.

13. The combination of claim 8, said cylindrical body having an outer diameter greater than the outer diameter of said means to receive a cutting end of a twist drill bit.

14. The combination of claim 13, said means to receive a cutting end of a twist drill bit having a greater diameter than said diameter of said double-ended drill bit.

15. The combination of claim 8, said cylindrical body having an outer diameter greater than the outer diameter of said means to receive a cutting end of a twist drill bit, said helically-shaped longitudinally extending members having a cross-sectional surface diameter greater than a cross-sectional surface diameter of said cutting ends.

* * * * *